United States Patent [19]
Thomson et al.

[11] Patent Number: 4,779,105

[45] Date of Patent: Oct. 18, 1988

[54] PRINTER INTERFACE

[75] Inventors: Christopher W. Thomson, Islington; Robert K. H. Liu, Willowdale; Neil J. Thomson, Don Mills, all of Canada

[73] Assignee: Delphax Systems, Mississauga, Canada

[21] Appl. No.: 105,160

[22] Filed: Oct. 6, 1987

[51] Int. Cl.⁴ .............................................. G01D 15/00
[52] U.S. Cl. .................................... 346/154; 346/159; 364/518
[58] Field of Search ............ 346/154, 159, 150, 153.1; 364/518-523; 400/114; 358/300, 261, 263; 101/DIG. 13

[56] References Cited

U.S. PATENT DOCUMENTS 4,149,192  4/1979  Takeuchi .............................. 346/154
4,686,545  8/1987  Kimura ................................. 346/154

Primary Examiner—Arthur G. Evans
Attorney, Agent, or Firm—Rogers & Scott

[57] ABSTRACT

The present invention relates to non-impact printing apparatus and more particularly to apparatus which converts originating image data in ASCII, EPCDIC or equivalent form into output image data in raster scan arrangement suitable for presentation to a printing subsystem.

2 Claims, 4 Drawing Sheets

CELL IMAGE ENGINE

CELL IMAGE ENGINE

PRINTER INTERFACE

The invention will be described with particular reference to an ionographic printer used as a peripheral to a host computer. Such printers use an ionographic print cartridge in association with suitable drivers to create a latent electrostatic image on the dielectric surface of a drum for subsequent toning and transfer to a receptor surface such as a paper sheet. The invention is of course useful as an interfacing apparatus between any data output device providing sequential code representing alpha-numeric images and a printing subsystem capable of receiving the data in raster scan format for reformatting and imaging on a medium such as paper.

Ionographic printers build up images in the form of written characters and other visual displays using a dot format. Latent dot images are created electrostatically on the drum at it passes a print cartridge and a full explanation of the operation of such a cartridge may be obtained from U.S. Pat. Nos. 4,155,093 to Fotland and Carrish, and 4,160,257 to Carrish. In short, the latent electrostatic images are built up from rows and columns of dots as the cartridge is energised. The drum then carries the latent images past a toner source and the areas carrying the images retain toner which is then transferred at a pressurised nip on to a receptor such as a sheet of paper.

The input data to the printer is normally supplied by a host computer which provides the data in a particular code such as ASCII, EPCDIC or the like. This data is passed to the printer for conversion to an equivalent dot image in situations where the host computer and the printer ae compatible, that is, they both utilize a similar code (most commonly they are made by the same manufacturer). The data from the host computer is passed directly to an image engine which processes the input data and output data in raster scan format to a printing subsystem. However, where the host computer and image engine are not directly compatible it is necessary to provide an interface between the host computer and the image engine. Such an interface converts the code from the computer to that of the image engine. The interface is, in effect, an emulator and translator so that the computer will communicate with the printer as if it were communicating directly with an image engine which used the computer's output code.

The printing subsystem converts the raster scan data to a latent electrostatic image which is then toned and transferred to paper sheets as they pass through a printing engine under the control of the subsystem.

At present, the interface, image engine and printing subsystem are combined in the printer as a single unit. Therefore, if it is desired to use the printer with a host computer which uses a different output code it is necessary to replace the complete unit.

It is a first object of the present invention to provide a control module for a printing subsystem to receive sequential data in code such a ASCII or EPCDIC, to translate the code into a native code, to manipulate the native code and to produce an output in raster scan dot imaging format.

It is yet another object of the invention to provide a control module which is defined by interchangeable layers of hardware connected to an inferface which carries native code between the layers and to provide for selection of parts of the hardware to match the requirements of the control module according to the form of the data input and the requirements for the output to the printing subsystem or subsystems.

Existing ionographic (and similar raster scan printers) use a combined interface and image engine in the form of a control module having a common processor. This leads to a certain lack of flexibility. For instance if the paper is to be printed on both sides of a sheet the image engine must first prepare the output for a first page (one side of the sheet) and then prepare to output for the second page. Consequently there is a time restriction. A further object of the invention is to provide a control module having the flexibility to permit addition of a second image engine which manipulates data in native code as required to enhance the speed of two sided printing.

The speed of printing can also be enhanced by manipulating parts of the input for a page simultaneously so that the time needed to manipulate a page of input data is shortened. Accordingly it is still a further object of the invention to provide a control module having the flexibility to manipulate parts of the same page of input data simultaneously to reduce the time for providing output data to the printing subsystem.

The invention will be better understood with reference to the following description taken in combination with the drawings in which.

Figure 1:
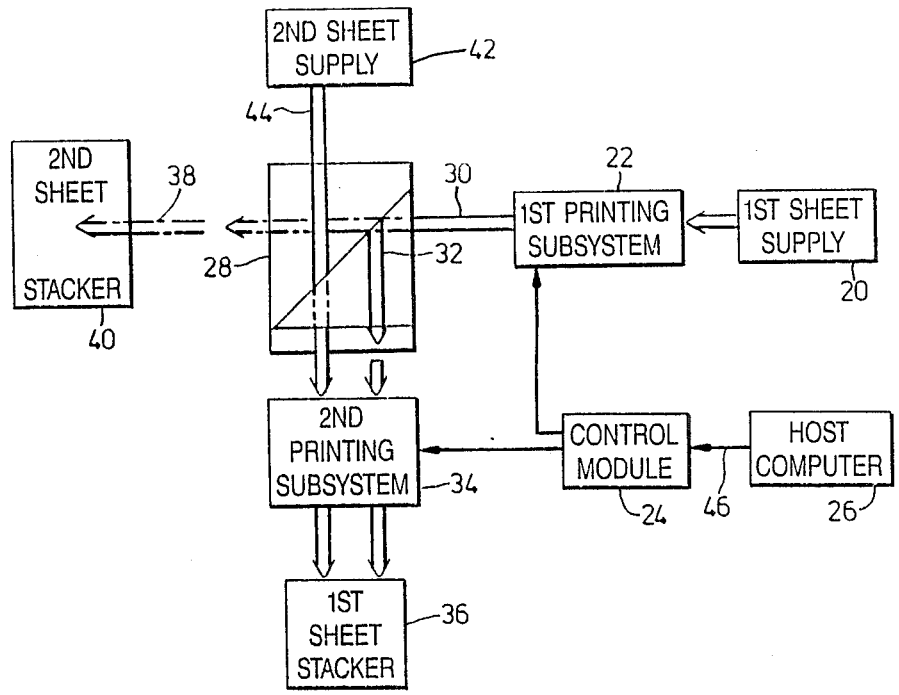
FIG. 1 is a diagrammatic representation of a printer capable of printing the pages on both sides of a sheet of paper using data provided by a host computer.

The preferred embodiment will be described with reference to FIG. 1 which is a diagrammatic representation of an exemplary printer used to selectively print on both sides of a sheet of paper or on one side only. (For the purposes of this description, one side of a sheet will be called a page: there are then two pages per sheet.) The paper paths are variable. Firstly, paper originates from a first sheet supply 20 which on demand feeds individual sheets at a predetermined rate to a first print subsystem 22. This subsystem receives serial data in raster scan order from a control module 24 which has processed originating data from a host computer 26. The first print engine prints a page on one side of the sheet as it feeds the sheet to a paper inverter 28. At this location the path of the paper changes from a path 30 to a path 32 and at the same time the paper is inverted. The printed page now faces down exposing a blank page for a second print engine 34 which is also under the control of the module 24. As the second print engine prints he second page, the sheet is fed into the first sheet stacker 36.

In the event that the paper originating from the sheet supply 20 is to be printed on one side only, then there are two possibilities. Firstly, the paper could follow the path just described and simply not receive an image from the subsystem 22, or alternatively, the paper can be made to continue on the path 30 and, as shown in ghost outline at 38, the paper will proceed to a second sheet stacker 40.

A further alternative for the system is to use sheets which originate from a second sheet supply 42. Paper from this supply is fed along a path 44 through the paper inverter 28 through which it travels directly proceeding to the second printing subsystem 34 and eventually to the first sheet stacker 36. This paper of course can be printed on one side only because it passes only one printing subsystem.

The control module 24 receives parallel data from the host computer 26 via a channel 46. Although in this example a channel such as that used by IBM is described, other types of communitions would be used. As will be described, the control module can be modified to emulate a peripheral printer to any host computer. Within the control module the parallel data in the format received from the host computer is translated into a "native" format used internally to create serial data in raster scan arrangement for the printing subsystems.

The control module is also designed to have sufficient flexibility that it can control more than two printing subsystems, and also, in order to maintain high speed, it is capable of processing the data from the host computer in parallel to format the raster scans for sections of a page contemporaneously so that the page can then be formatted faster to match the desired paper feed rates.

The control module uses a flexible layered hardware architecture which in this instance includes two layers as will be described. Layers within these layers and more cards within the layers can be added within the scope of the invention.

Figure 2:
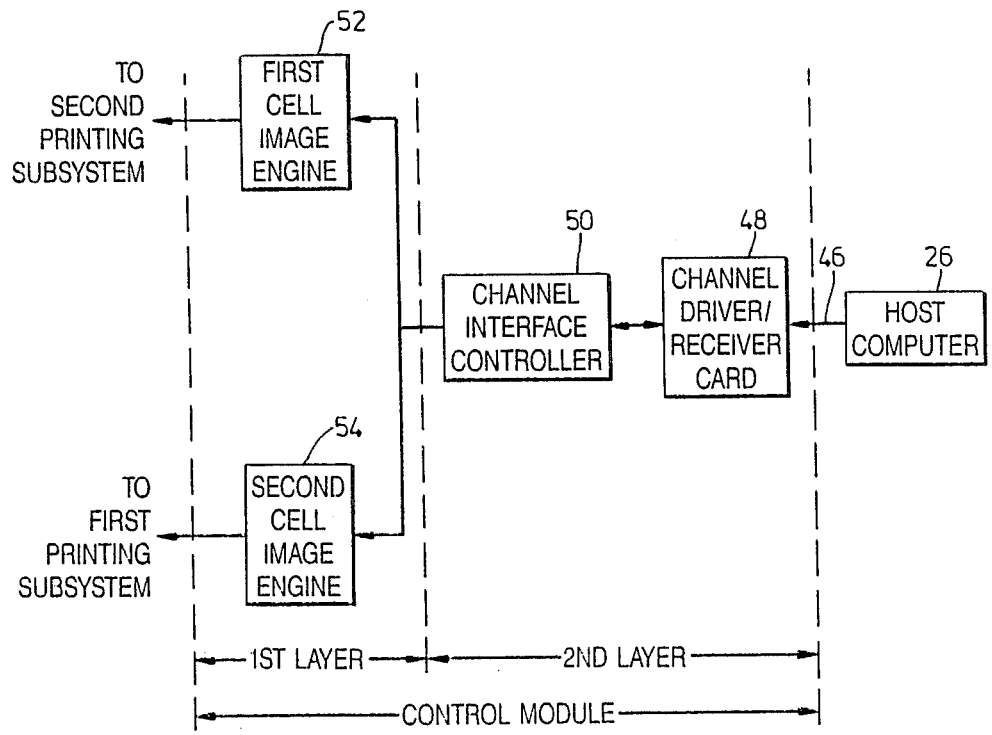
FIG. 2 is a representation of the major components of a control module forming part of the printer shown in FIG. 1.

As seen in FIG. 2, the control module consists of two layers. The first layer includes a channel driver/receiver card 48 which receives data through the channel 46 from the host computer 26. The card interfaces with a channel interface controller 50 also found in the first layer. This controller will be described in more detail with reference to FIG. 3 and for the moment, with reference to FIG. 2, it will be evident that output from the interface controller will pass to first and second cell image engines 52, 54. This output is in native code: all data planning through the connections between the layers is in native code.

The page format is either selected at the first layer or is part of the output from the host computer. The format defines a layout of rows and columns of cells which after translation into native code is stored in immediate memory in the second layer as a list. Subsequently character data is translated and written into the cells from the originating data coming from the host computer.

The cell image engine output serial data to the respective printing subsystems 22, 34 (FIG. 1) and this data includes raster scan imaging to be converted by the printing subsystems to dot imaging on the page.

Figure 3:
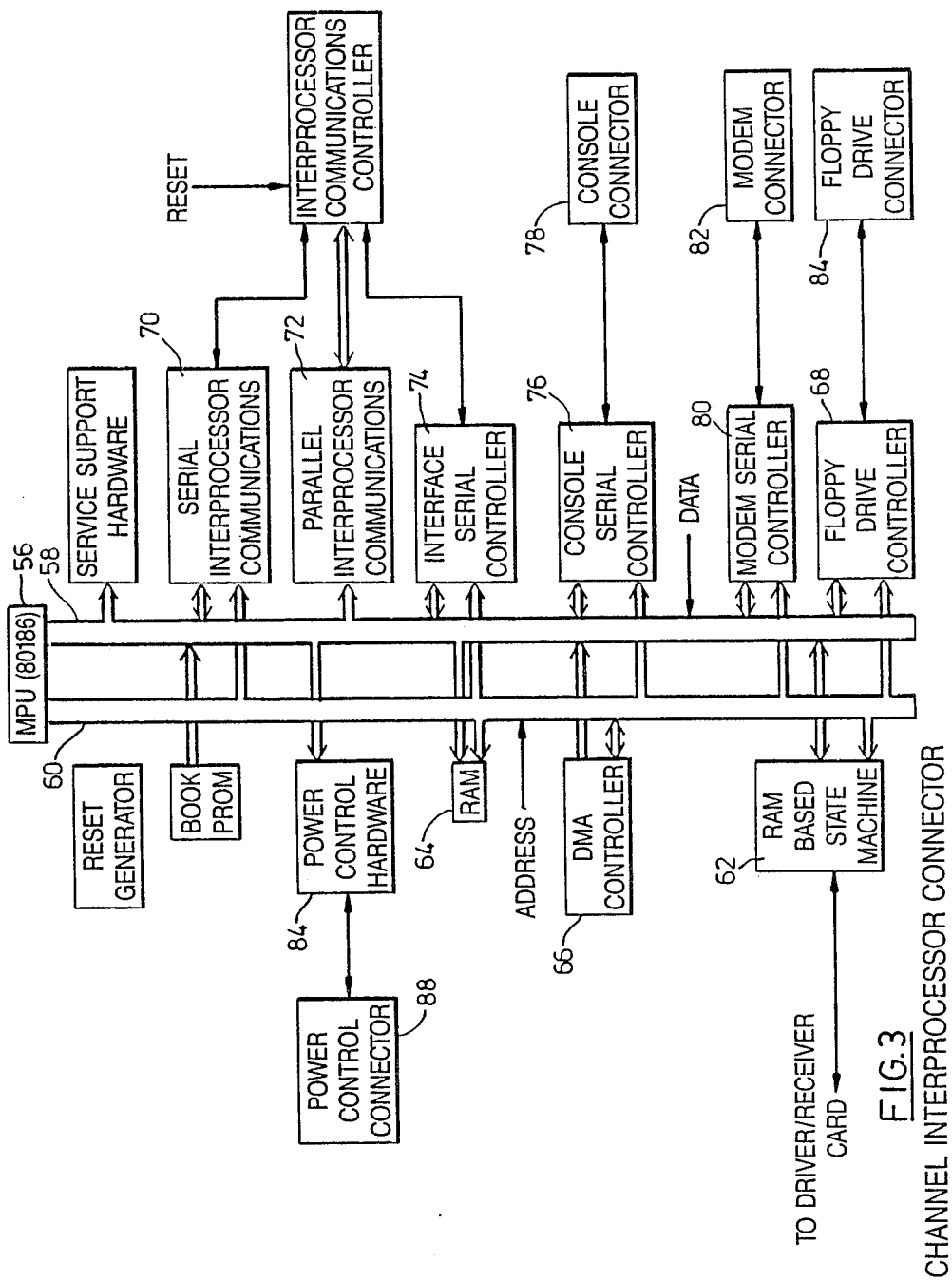
FIG. 3 is a chart showing the interrelationships between hardware used as a first layer of the control module.

Reference is next made to FIG. 3 to describe the channel interface controller in more detail. The interface controller shown generally in FIG. 3 in block diagram form, uses an Intel 80186 Microprocessor 56 connected by a data bus 58 and address bus 60 to a series of hardware devices.

The channel driver/receiver card 48 (FIG. 2) is connected to the controller at a RAM based state machine (RBSM) 62 through a TTL interface. The state machine is a high speed (100 nsec cycle time) state machine which controls the channel interface. The microcode instructions for the state machine are stored in RAM within the RBSM 62 and the microprocessor 56 has unrestricted read and write access to this RAM. The RBSM can generate direct memory access (DMA) requests to the DMA controller 66 and interrupt requests to the microprocessor. The RBSM handles the channel signalling required for initial selection, data transfer and status presentation. In order to implement the RBSM in a minimum amount of hardware, micro code is used for functions such as parity checking, parity generation, channel address checking, channel address output and command decoding. The channel address and initial status are set by modifying the instructions which the RBSM executes.

As mentioned previously, the RBSM receives and drives TTL level signals. These signals are converted from and to channel signal levels by the driver/receiver card. The channel cables connect directly to the driver/receiver card which is in the same layer of the control module. Also, the driver/receiver card has the relays which bypass the select signal when the printer is off-line. It also has jumpers which choose select out or select in for use as the selection signal. The driver/receiver card is mounted in a small box on the side of the control module and connects to the channel interface controller card through a permanently attached ribbon cable. A ferrite bead is mounted on this cable at the point where it exits from the control module and the use of a separate card for the channel connector's drivers and receivers allows the channel interface controller card to be replaced without taking the channel down. It also allows for EMI filtering between the control module and the channel without degrading the channel signals.

The microprocessor 56 has 512K bytes of DRAM and 64K bytes of EPROM. The floppy drive controller 68 connects to a 3.5 inch floppy disc drive on which is stored the fonts and formats to be used by the cell image engines. The control programs for all of the microprocessors in the system are also stored on the floppy disc. This includes the microprocessor in the printing subsystem controller and the microprocessors in the feeder, paper inverter and stacker of the printer.

The serial interprocessor communications 70 allows the microprocessor to communicate with any other processor in the control module. These are separate DMA channels for the send and the receive and the serial interprocessor communication uses an HDLC frame format and runs at 800K bits per second. The parallel interprocessor communications 72 allows the microprocessor to send data to the cell image engines which will be described with reference to the second layer of the control module. Data transferred on the parallel interprocessor communications is outputted to the microprocessor directly. The parallel interprocessor communications is 16 bits wide and runs at approximately 2M bytes per second.

Figure 4:
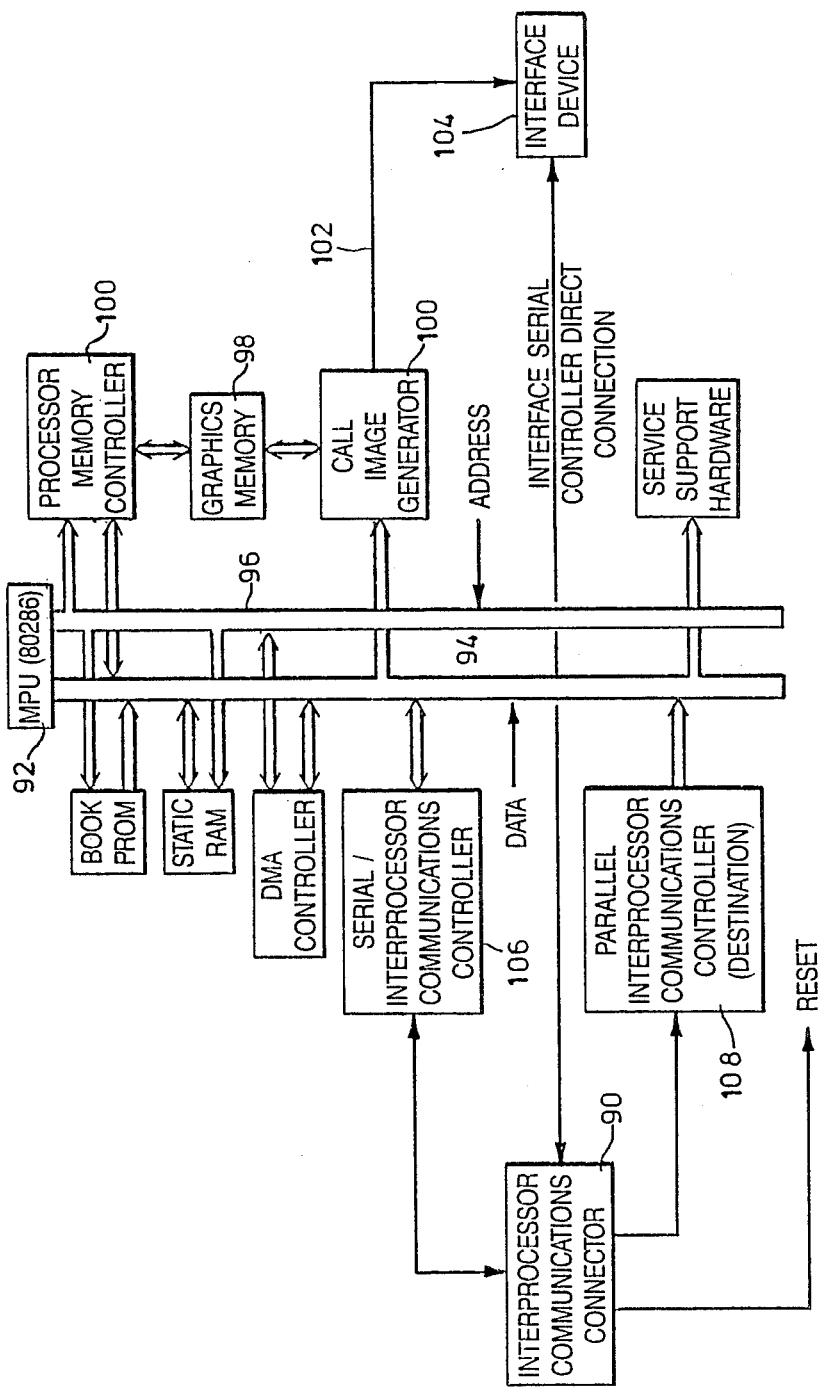
FIG. 4 is a drawing similar to FIG. 3 and showing the hardware of a second layer of the control module.

The interface serial controller 74 drives the serial data path to the printing subsystem controller through an interface device 104 (FIG. 4). The serial signals are wired to the interface with the printing subsystem directly through the second layer as will be described. This permits the layers to be separated without interfering with the connection to the output interface of the control module.

The console serial controller 76 is used for communication with the operator console terminal through a console connector 78. This permits selection of font and format. Similarly, the modem serial controller 80 has a connector 82 and the floppy drive controller 68 has a connector 84. The modem serial controller is used for diagnostic purposes only.

Power control hardware 86 is provided through a connector 88 to allow the microprocessor to control the turning off of power to the printer equipment shown in FIG. 1. The power is turned on by the operator pressing a momentary push button, the power is turned off when a relay is opened by the microprocessor.

Returning to FIG. 2 momentarily, it will be evident that the description of the first layer of the control module has now been completed. This layer is connected to the second layer via a mechanical connector 90 labelled in FIG. 2 "Interprocessor Communications Connector." A similar label at 92 of FIG. 4 indicates where the connection is completed. The connectors allow the first layer to be removed and replaced with different hardware to emulate a different printer for a different host computer. Of course no matter which first layer hardware is selected the data output to the second layer will be in native commands so that the second layer is unaware of the change in first layer. This flexibility permits significant variations in use for the control module.

Turning now to the second layer of the architecture, reference is made to FIG. 4. The cell image engine shown in FIG. 4 would be duplicated as shown in FIG. 2 for the printer shown in FIG. 1. The connection would be through a further communications connector 90 and the image engine shown in FIG. 4 is typical of further engines used in this way. The image engine manipulates data in native code only. All data originating in the first layer is translated before it is used in the second layer.

The image engine includes a microprocessor 92 (Intel 80286) connected through data and address buses 94, 96 to various hardware. The microprocessor has 64K bytes of zero wait state static RAM and 64K bytes of EPROM. The microprocessor has direct access to 656K bytes of memory in graphics memory 98 and indirect access to the entire graphics memory. This is controlled through the processor memory controller 100. Output from the graphics memory is also to a cell image generator 100 and the procedure for developing the image will be described in further detail with reference to an exemplary assembly of an imaged page. The cell image generator creates serial raster scan data through link 102 to an interface device 104 which mechanical coupling to one of the printing subsystems 22, 2 (FIG. 1).

A serial interprocessor intercommunications controller 106 allows the microprocessor to communicate with any other processor in the control module. There are separate DMA channels for the send and the receive. A parallel interprocessor communications controller 108 has a separate DMA channel.

The cell image engine is reset by the channel interface controller through the interprocessor communications connectors 90.

Figure 5:
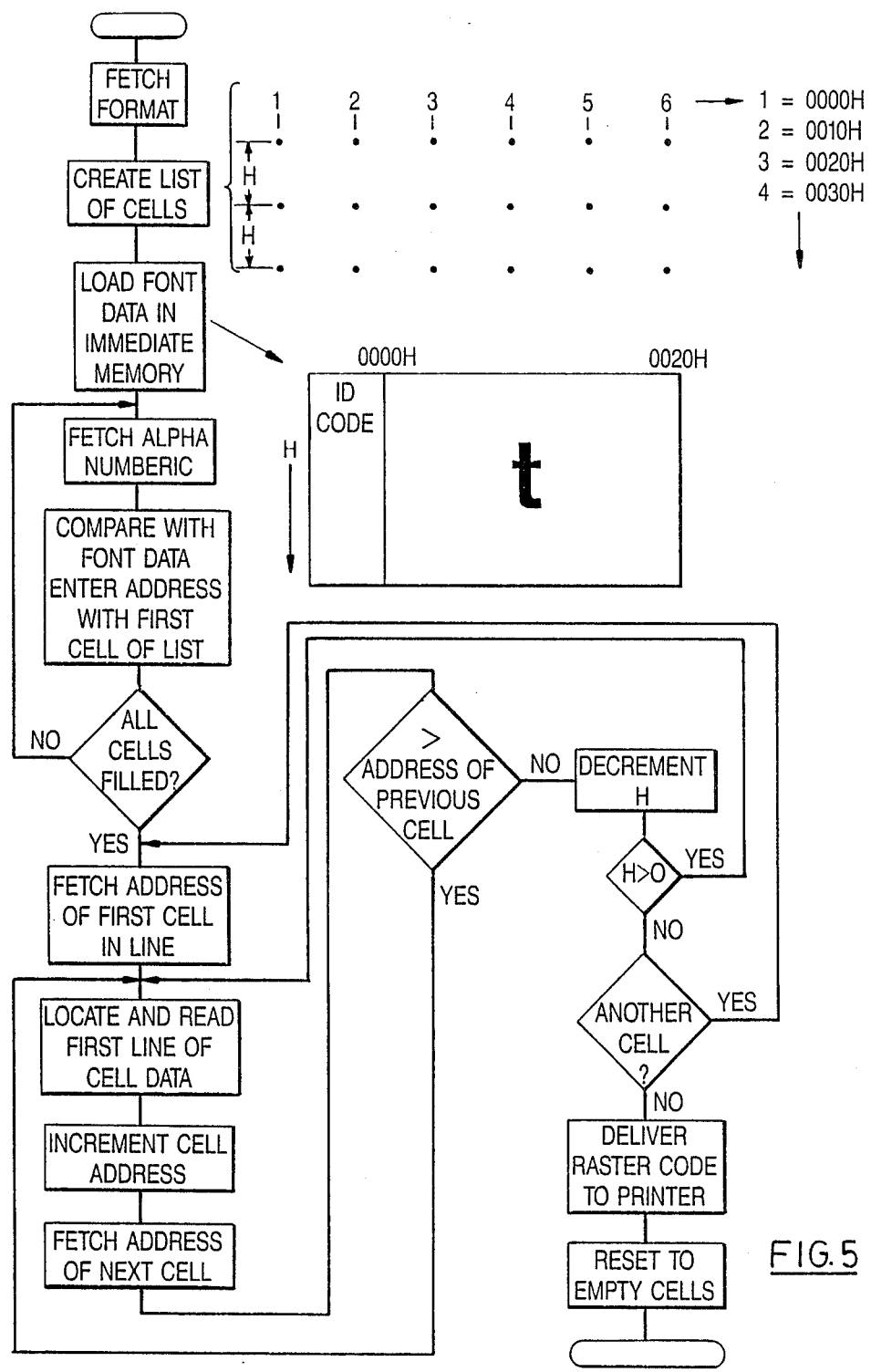
FIG. 5 is a flow chart showing the operation of an image engine.

The use of the control module is illustrated in the top down flow chart of FIG. 5. The operator selects from a console a desired font style and page format. This information is used to find the selected font and format from the floppy disc storage via the controller 68. The data is stored in two ways. The list of cells corresponding to the format is stored in list form in graphics memory to identify the locations of individual cells in the page. Each cell is identified by its top left first dot of the raster scan on the first line and by the height of the cell in terms of raster scan lines as indicated at the top right of FIG. 5. The location on the page is sequential with reference to preceeding and following cells. Because the cells are of similar width and height, it is possible to relate them to one another in this way.

The selected font is also stored in immediate memory arrangement in the graphics memory with an address for each character. The characters are 32 bits wide and are of similar height H in terms of raster scan lines. Each element of the raster scan is stored consecutively in immediate memory so that it is possible to fetch a complete character by calling for subsequent memory elements starting with the first and ending at the last line of raster scan for that character. Because in this example the height H of the characters is constant, a preset counter can be used to fetch the necessary number of memory elements to build up the raster scan format for that character.

Once the font and format data and list have been established in graphics memory, the control module is ready to receive character data from the host computer. This is driven by the channel driver/receiver card 48 and received by the channel interface controller 50. Next the character data which is in serial order according to the characters to be printed must be matched with the cell format. The translated character information passes to the cell image engine and by matching the required font character with the first line address of that font, the first line address can be added to the cell list in the order in which the characters are received. The cell list is then filled with addresses of characters so that the cell image engine is then prepared to create at the cell image generator 100 a raster scan representation of the characters required to be printed.

The cell image generator 100 processes the format list in order counting the developing raster scan lines until all of the raster scans of the first row of characters is developed and sent serially through the interface device to the printing subsystem. As soon as all of the raster scans have been fetched for the first row of characters, the next row of addresses from the list is processed in the same way and this continues until the page is completed.

It will be evident that for this procedure to work, the format of the cells must be in the order of the characters to be printed and the addresses in the list kept correspondingly. Also, each character bust be stored in sequential memory elements so that they can be fetched in sequence. It would of course be possible to use other memory organisations such as direct memory but this would add to the data to be stored and increase the necessary size of the graphics memory.

As mentioned previously, the system lends itself to use in the printer shown in FIG. 1. In this case, the cell image engine would be duplicated and alternate pages processed for subsequent delivery to respective printing subsystems 22, 24. The use of two cell image engines will make it possible to print on both sides of the paper at relatively high speeds.

It is also possible to enhance the speed of the control module by the use of simultaneous processing of data using two image generators 100. For instance the data for the first half of a page can be processed by one of the generators while the data for the second half of the page is processed by the other generator. Subsequently the data is sent consecutively through the interface device 104 to a printing subsystem where it is assembled and ready for imaging.

We claim:

1. A control module for use in a peripheral printer to a host computer, the host computer output being a code representing alpha-numeric characters in order for printing on the page, the apparatus comprising:

a first layer having a channel driver/receiver for communicating with the host computer, a channel interface controller, a first part of an interprocessor communications connector, the interface controller including means controlling access to a storage device having at least one font set and at least one cell format arrangement for selectively fetching the font set and format arrangement on demand, and translation means for converting data originating from the host computer and if necessary from the storage device into a native code, and a serial controller;

a second layer including at least one cell image engine operable in native code and including a second part of the interprocessor communications connector for releasable connection to said first part; memory means for storing a list of cell addresses in native code in order of format arrangement and for storing font data in native code in immediate memory arrangement; and a cell image generator for fetching font data are required by the selection of alpha-numeric characters and identifying sequentially in the list of cells the addresses of the corresponding font data in the order of the alpha-numeric data and means accumulating the font data in raster scan arrangement for serial communication to a printing subsystem.

2. A printer for receiving alpha-numeric code from a host computer and for creating an image on paper representative of the code in human readable form, the printer comprising:

a controle module as claimed in claim 1; and a printing subsystem connected to the control module by a releasable connection and comprising an ionographic cartridge, means converting the raster scan data into a form suitable for driving the cartridge, and a printing engine cooperating with that cartridge to place the image on the paper.

* * * * *